United States Patent [19]
Smith, Jr.

[11] 3,856,631
[45] Dec. 24, 1974

[54] PROCESS AND APPARATUS FOR SEPARATING WATER FROM NON-VOLATILE SOLUTES

[75] Inventor: Calvin S. Smith, Jr., El Cerrito, Calif.

[73] Assignees: Harrison W. Sigworth, Orinda; Thomas N. Finical, Jr., San Carlos, both of, Calif. ; a part interest to each

[22] Filed: Feb. 7, 1972

[21] Appl. No.: 224,018

Related U.S. Application Data

[63] Continuation-in-part of Ser. No. 19,592, March 16, 1970, Pat. No. 3,640,850.

[52] U.S. Cl. ...................... 203/11, 203/23, 203/24, 203/91, 203/100, 202/173, 202/185 A, 159/DIG. 17
[51] Int. Cl. ........ B01d 3/02, B01d 3/00, B01d 3/10
[58] Field of Search ............ 203/11, 23, 24, 22, 21, 203/100; 202/173, 185.2; 159/2 MS, DIG. 17, 18, D 8; 210/21, 22

[56] References Cited
UNITED STATES PATENTS

| | | | |
|---|---|---|---|
| 2,749,094 | 6/1956 | Lewis et al.................. | 159/DIG. 17 |
| 3,219,554 | 11/1965 | Woodward................... | 159/DIG. 17 |
| 3,232,847 | 2/1966 | Hoff............................ | 159/DIG. 17 |
| 3,298,932 | 1/1967 | Bauer.................................. | 203/11 |
| 3,337,421 | 8/1967 | El Roy........................ | 159/DIG. 17 |
| 3,410,339 | 11/1968 | Wiegandt.................... | 159/DIG. 17 |
| 3,438,202 | 4/1969 | Roe............................. | 159/DIG. 17 |
| 3,446,712 | 5/1969 | Othmer....................... | 159/DIG. 17 |
| 3,457,143 | 7/1969 | Kunst.......................... | 159/DIG. 17 |
| 3,627,646 | 12/1971 | Osctor ........................ | 159/DIG. 17 |
| 3,640,850 | 2/1972 | Smith, Jr..................... | 159/2 MS X |
| 3,649,470 | 3/1972 | Hunter et al. ............. | 159/2 MS UX |
| 3,689,366 | 9/1972 | Satone .............................. | 202/173 |

*Primary Examiner*—Jack Sofer
*Attorney, Agent, or Firm*—Edward B. Gregg

[57] ABSTRACT

Apparatus and method for distilling aqueous solutions, especially saline water, for the purpose of producing fresh water, wherein a heat transfer medium in the form of a lower boiling immiscible liquid is employed in a manner to give up its latent heat of condensation directly to the solution and the resulting condensate is re-evaporated by heat from the resulting fresh water; such apparatus and method providing certain advantages such as ability to work with a small heat differential between the temperature of the source of external heat and the temperature of the heat sink.

24 Claims, 5 Drawing Figures

PROCESS AND APPARATUS FOR SEPARATING WATER FROM NON-VOLATILE SOLUTES

This application is a continuation-in-part of my copending application Ser. No. 019,592, filed Mar. 16, 1970, which will issue as U.S. Pat. No. 3,640,850 on Feb. 8, 1972.

This invention relates to the treatment of water, by direct contact with a heat transfer medium, to separate the water from dissolved material such as salt as in the case of sea water, or an organic material and/or phosphates and the like in the case of treated sewage, etc.

In my copending application referred to above, a method and an apparatus are described for separating water from non-volatile solutes such as salt. (Sea water will be referred to for the most part, but it will be understood that other saline water, treated sewage and the like can be treated in accordance with the present invention.)

In the aforesaid copending application sea water is heated in a first zone by direct contact with an immiscible medium which boils at a lower temperature than water, under conditions to bring about condensation of the vapor of immiscible medium whereby the latter gives up its latent heat of condensation to the sea water. The resulting heated sea water is then removed to a flashing zone wherein it is flashed, preferably in stages. The condensate of immiscible medium is circulated to a zone in which it is re-evaporated by direct contact with hot fresh water produced in the process. This results in cooling the fresh water which is then used to condense the water vapor produced by flashing. A portion of the circulating water is withdrawn as product and a portion of the circulating sea water is withdrawn to prevent undue build-up of solute. An external heat input, as by means of direct or indirect steam and/or vapor compression, is also effected to supply the heat needed to make up for heat losses.

In this process the immiscible liquid may be denser than, but preferably it is lighter than, water. It may have a wide boiling range and may include a considerable variety of molecular species, or it may be narrow boiling, and may contain only a few molecular species which boil close together or it may be a single molecular species. Single species such as normal pentane or carbon tetrachloride, a narrow boiling range mixture such as a mixture of normal and branched chain pentanes, a wider boiling mixture such as a light gasoline. Examples of suitable immiscible media are as follows:

Normal and branched chain pentanes
Normal and branched chain hexanes
Normal and branched chain heptanes
Mixtures of any or all of the above
Mixtures of any of the above with normal or isobutane
Cyclohexane
Benzene
Mixtures of benzene and cyclohexane
Mixtures of any of the above paraffinic hydrocarbons or hydrocarbon mixtures with benzene, cyclohexane or mixtures of benzene and cyclohexane
Furan Among immiscible liquids that are more dense than water and which are suitable for purposes of the present invention are chloroform, carbontetrachloride, dichloromonofluoromethane.

By this method the disadvantages of conventional distillation methods are avoided or are greatly diminished. In conventional processes, heat from a source such as steam is caused to pass to the sea water through a metallic barrier such as the wall of a tube. The disadvantages of this method, including corrosion of tubes, are described in detail in the aforesaid copending application.

It is an object of the present invention to provide improvements upon the method and apparatus of my copending application.

It is a further and particular object of the present invention to provide an improved method and an improved apparatus which can more efficiently employ a narrow boiling range immiscible medium or a single molecular species.

It is another object of the invention to provide improvements whereby the efficiency of the process can be improved.

Yet another object is to provide a method and apparatus which can efficiently utilize the waste heat of a steam-electric power plant and are able to work between temperature limits of, for example 60° and 180°F.

The above and other objects of the invention will be apparent from the ensuing description and the appended claims.

Several embodiments of the invention are illustrated by way of example in the accompanying drawings in which, FIG. 1 is a view in vertical longitudinal section of one embodiment of the invention employing preferably a narrow boiling range immiscible liquid or a single molecular species and employing concurrent flow of the immiscible liquid medium and sea water in the sea water heating zone.

Figure 1:
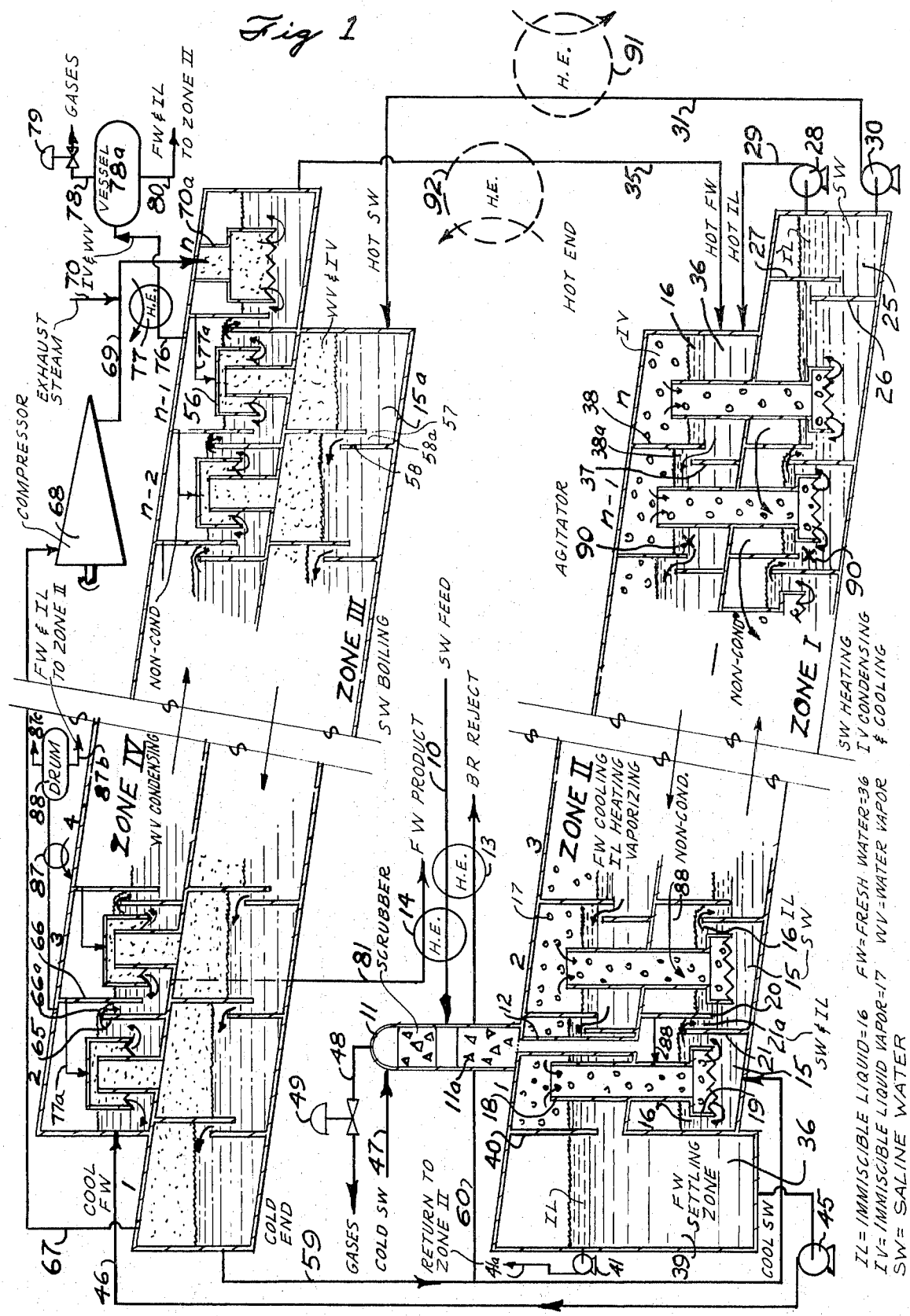

In the drawings certain fluids are identified by lettered symbols which are set forth below for convenience of reference.

LEGEND

| SYMBOL | MEANING |
| --- | --- |
| SW | Saline Water |
| FW | Fresh Water |
| IV | Immiscible vapor (i.e. the vapor of immiscible liquid) |
| IL | Immiscible liquid |
| WV | Water Vapor |
| S | Solution |

Referring now to FIG. 1, there are four zones indicated as Zone I, Zone II, Zone III and Zone IV. In Zone I sea water is heated by the condensation of immiscible vapor. In Zone II the resulting condensate (immiscible liquid), after separation from the sea water, is re-evaporated by contact with hot fresh water produced in the process. In Zone III the sea water heated in Zone I by absorption of the latent heat of condensation of immiscible vapor is flashed and in Zone IV the resulting vapor of fresh water is condensed by contact with cold fresh water resulting from re-evaporation of immiscible liquid.

Further describing the apparatus and method of FIG. 1, cold sea water which has been treated to remove suspended solid matter if necessary enters the system through line 10 and passes through a treatment apparatus 11 and a conduit 12, into stage 1 of Zone I. This entering sea water is heated to some degree by heat exchangers 13 and 14 as described hereinafter. Packing material 11a promotes gas-liquid contact in apparatus 11. In Zone I the sea water is indicated by the reference numeral 15, the immiscible liquid by the reference numeral 16 and the immiscible vapor by the reference numeral 17. (The liquid phases in Zones I and II are shown as separate layers, but these phases may be, and preferably are, commingled by agitators and by turbulence.) Spargers, bubblers or other known type of gas-liquid contact devices are provided each of which has a tubular portion 18 and a bubble cap or other distributor member 19, such being of known construction, through which vapor of the immiscible medium is conducted into Zone I for intimate contact with the sea water. A vapor baffle 20 and a liquid baffle 21 spaced therefrom are provided, which form a space 21a through which liquid flows from stage 1 to stage 2. The baffles 20 and 21 prevent vapor communication between these two stages. For such purpose only the vapor baffle 21 is necessary but the space 21a provided by the two baffles promotes contact of the two liquids. The same is true of other baffle pairs in Zones I, II, III and IV; i.e., only the vapor baffles of each pair is necessary but the baffle pair and the space between them promote liquid contact and/or liquid vapor contact. An additional advantage of the double baffles is that they assist in starting up the apparatus. Sea water together with condensate of the immiscible medium flows through the space 21a from stage 1 to stage 2, the sea water having been heated an increment in stage 1 and carrying with it an increment of condensate of immiscible medium formed in stage 1. This process is repeated in stage 2 by reason of vapor of immiscible medium entering through the respective sparger whereby the sea water is heated another increment and a further quantity of immiscible vapor is condensed and gives up its heat to the sea water. This process is repeated from stage to stage in Zone I until the heated sea water and condensate of immiscible medium reach stage $n$. Typically $n$ may be about 20 to 75. A separation zone 25 is formed by baffles 26 and 27 which permit the sea water and the layer of immiscible liquid to flow into the zone 25 and permits settling of the heated sea water from immiscible liquid. The baffle 27 also prevents flow of vapor into the separation zone. The separated immiscible liquid is pumped by a pump 28 through a line 29 into stage $n$ of Zone II. The heated sea water is pumped by a pump 30 through a line 31 to stage $n-1$ of Zone III.

Referring now to Zone II, hot fresh water produced in Zone IV as described below is circulated through line 35 into stage n of Zone II. In this and the other stages of Zone II fresh water is indicated by the numeral 36 and the immiscible liquid by the reference numeral 16. The hydrostatic pressure exerted by the column of fresh water in line 35 together with the pressure differential from stage $n$ to stage 1 of Zone II will cause flow of the liquids from stage $n$ up through all of the stages to stage 1 of Zone II. Each of the stages is separated from the adjacent stage or stages by a liquid barrier 37 and a vapor barrier 38 providing a space 38a therebetween through which the liquid can flow but preventing the vapor communication between successive stages. In each of these stages an increment of immiscible liquid is vaporized and its vapor will pass as described above through the respective sparger into the respective stage of Zone I. The stages of Zone II (likewise those of Zone I) are shown in their preferred arrangement, at increasing heights from stage n to stage 1, but they may be all at the same height. In either case the depth of liquid in stage $n$ of Zone II is less than in stage $n-1$, and the depth increases from stage $n$ to stage $n-1$ because the heating medium (recycled fresh water from Zone IV) is hottest in stage $n$, somewhat cooler in stage $n-1$, etc. Therefore the vapor pressure of immiscible medium diminishes from stage $n$ to stage 1. Since the vapor pressure is substantially the same (although slightly less) in each stage of Zone I as in the corresponding stage of Zone II, the depth of liquid in the stages of Zone I likewise increases from stage $n$ to stage 1.

It will also be apparent that in each stage of Zone II circulating fresh water 36 will be cooled another increment. A settling zone is provided at 39 to settle out the fresh water 36 (which is now relatively cold) from any unevaporated immiscible liquid. The settling zone 39 is separated from stage 1 of Zone II by a baffle 40. The upper layer of immiscible liquid in settling zone 39 is returned by a pump 41 and line 41a to a stage of Zone II. Cold fresh water is removed from Zone II and is pumped by a pump 45 through a line 46 to stage 2 of Zone IV. Referring again to apparatus 11, cold incoming sea water entering through line 47 serves to scrub the effluent gas and vapor to condense and return water vapor and immiscible vapor; and non-condensable gases are vented through line 48 and valve 49.

Turning now to a decription of Zone III and Zone IV, heated sea water indicated by the reference numeral 15a enters stage $n-1$ of Zone III and an increment vaporizes in that stage. The resulting vapor of water passes through a sparger or bubbler device 56 into the corresponding stage (stage $n-1$) of Zone IV. The unevaporated sea water in Zone III then passes through a space 58a between a baffle 57 and a baffle 58 into the next stage of Zone III. This process continues and flow is maintained under the pressure differential that exists between stage $n-1$ and stage 1 of Zone III. At each stage an increment of sea water is vaporized and the vapor passes to the corresponding stage of Zone IV. Sea water or brine, now fully cooled, passes through line 59 to stage 1 of Zone I and a portion is removed through a line 60 to avoid build up of salt content. Since the brine removed from the system is warmer than the incoming sea water introduced through line 10, it is caused to give up heat to the incoming sea water by means of heat exchanger 13.

In Zone IV cold fresh water introduced through line 46 enters stage 2 and serves to condense water vapor therein. A baffle 65 and a baffle 66 provide a space 66a therebetween through which water (the input of cold fresh water from Zone II plus an increment of condensed water vapor derived from stage 2 of Zone III)

pass to the next stage (stage 3). This process continues until the fresh water reaches stage n of Zone IV. In each of the stages of Zone IV the circulating fresh water is, of course, heated another increment. This provides a supply of hot fresh water which is circulated as described above through line 35 to stage n of Zone II and provides the heat needed to re-evaporate immiscible liquid.

Water vapor from stage 1 of Zone III is caused to pass through a line 67 to the inlet of a compressor 68, thence through a line 69 to a sparger 70 by which it is introduced to stage n of Zone IV. A further heat input to the system is provided by way of exhaust steam through line 70. Non-condensables such as air are removed from stage n of Zone IV to lower pressure stage $n-1$ by a small bleed line 77a. Fresh water is withdrawn as product through line 81 from stage 3 of Zone IV and gives up heat in heat exchanger 14 to incoming sea water. Fresh water may be withdrawn at other points in the system than at stage 3 of Zone IV but there is an advantage in withdrawing it from this point. If fresh water is withdrawn at a later stage or from line 35 the added heat it contains as compared to the heat in stage 3 will not be used as effectively in the indirect or out-of-contact heat exchange in heat exchanger 14 as in the direct or in-contact heat exchange in Zone II. If fresh water is withdrawn from an earlier stage or from line 46 it will contain a minute but possibly objectionable quantity of immiscible liquid which, of course, has a slight but finite solubility in water. In stage 3 of Zone IV because of the higher temperature of the fresh water and because it has had time to come to a state of equilibrium with its vapor, the content of immiscible liquid is correspondingly less and is not significant.

In addition to the major flows of fluid (liquid and vapor) described above, provision is made for quantitatively minor flows which serve certain important functions as will be apparent from the following description.

As the hydrostatic pressure on the hot sea water diminishes while it passes up through the column in line 31, the small amount of dissolved immiscible liquid will vaporize and it will flash off in stage $n-1$ of Zone III and will pass into stage $n-1$ of Zone IV along with the increment of water vapor that is flashed in stage $n-1$ of Zone III. The immiscible vapor plus inert gas from line 77a passes, with some water vapor, by line 76 to condenser 77. The condensed water and immiscible liquid are collected in vessel 78a. Non-condensables are vented by line 78 and pressure control valve 79. The condensate from 78a is returned to the system by line 80.

As a means of eliminating non-condensable gases such as air from the system, small bleed lines, one of which is shown at 77a between stages 3 and 2 of Zone IV, may be provided between the successive stages ($n-1$ to $n-2$; $n-2$ to $n-3$, etc.) of Zone IV so that these gases will accumulate in stage 2 of Zone IV. The accumulated gases along with immiscible vapor flashed in stage 2 of Zone IV and concomitant water vapor pass through a condenser 87 which condenses the water and immiscible liquid which is collected in drum 87a and is returned to Zone II by line 87b. Non-condensables are vented by line 87c.

In Zones I and II non-consensable gases pass by saall bleed lines 88 in each stage to the sparger tubes 18 and ultimately pass out of the system through sea water inlet duct 12, apparatus 11, valve 49, etc.

As further variants and/or elaborations of the system of FIG. 1, the following may be mentioned: To provide good liquid-liquid and liquid-vapor contact, mechanical agitation may be provided in any or all of the stages in Zones I and II and also in the stages of Zones III and IV. Such agitators are shown by way of illustration at 90 in various stages.

In a variant of FIG. 1, stage 1 of Zone III is eliminated, compressor 68 is eliminated and heat input is by way of exhaust steam from a steam power plant through line 70.

In another variant, stage 1 of Zone III and stage n of Zone IV are eliminated, condenser 77 is connected to stage $n-1$ of Zone IV, compressor 68 is eliminated and the energy input is by way of heat exchanger 91 and/or 92 in lines 31 and/or 35.

In yet another variant, compressor 68 is driven by a gas turbine (not shown) and the hot gases from the turbine are used to generate high pressure steam which in turn is used to operate a steam turbine which operates the feed pumps, circulation pumps, agitators, etc., of the system. The exhaust steam from the steam turbine is used as a heat input in line 70 and/or in heat exchangers 91 and 92. Make up water for the steam generator is a portion of the fresh water produced by the system.

In a variant of FIG. 1, the compressor 68 could be driven by a steam turbine driven by high pressure steam from fossil fueled or nuclear fueled steam generators. Exhaust steam could be used alternatively in line 10 or in exchangers 91 or 92.

Figure 2:
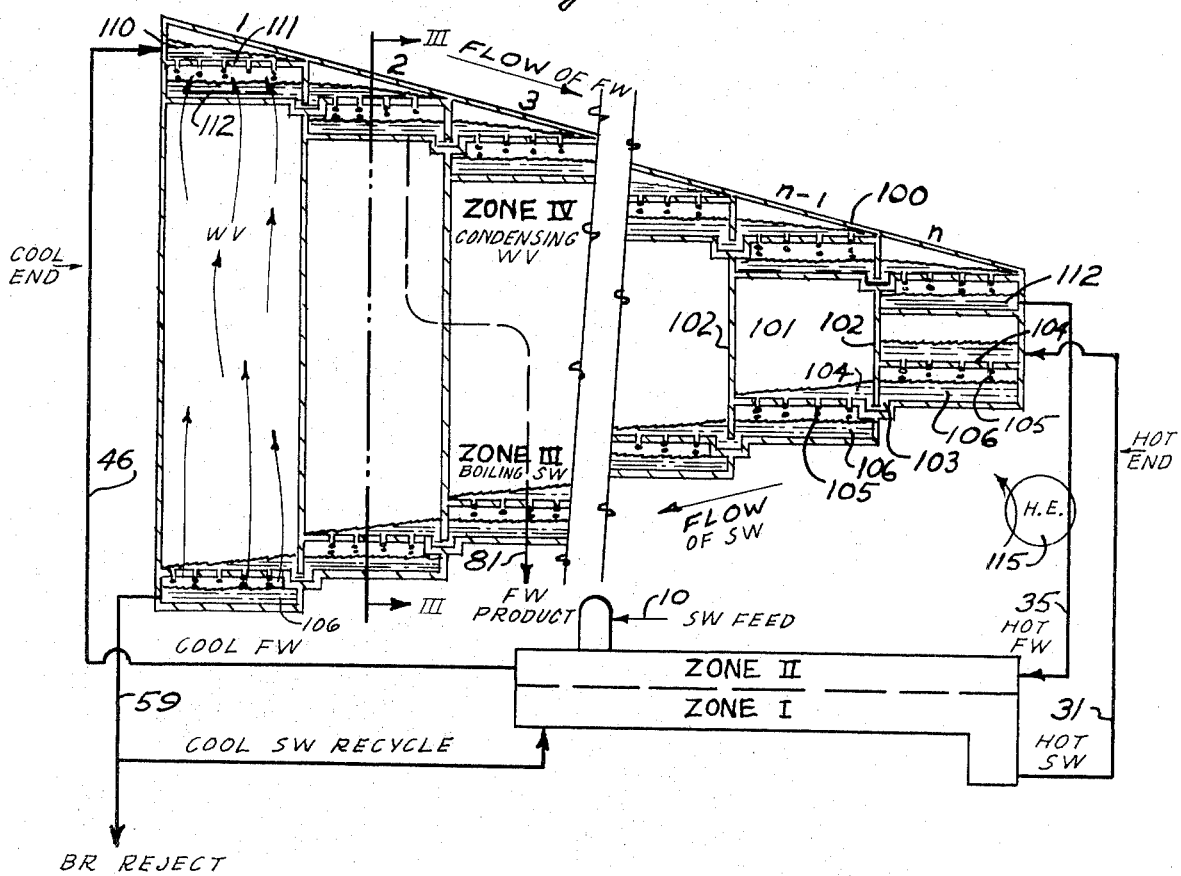
FIG. 2 is a view in vertical longitudinal section of another embodiment which is specially adapted to utilize waste heat from the condenser of a steam-electric power plant, whether operated by fossil fuels such as coal, oil or natural gas, by nuclear power or by geothermal steam.
Figure 3:
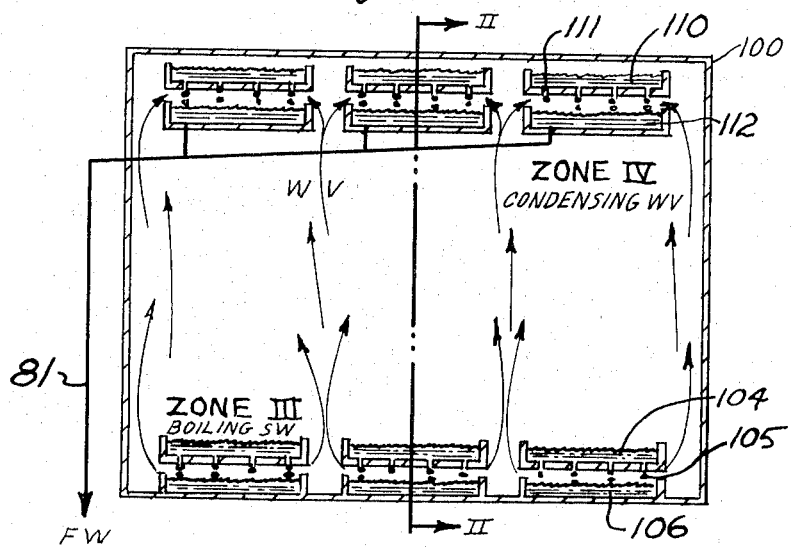
FIG. 3 is a section taken along the line 3—3 of FIG. 2.

Referring now to FIGS. 2 and 3, Zones I and II may be as illustrated in FIG. 1. Zones III and IV are enclosed in a housing 100. The flow of hot sea water from Zone I to Zone III, of hot fresh water from Zone IV to Zone II, of cold fresh water from Zone II to Zone IV and of recycled sea water or brine from Zone III to Zone I, and also withdrawal of brine and fresh water from the system, are illustrated by lines numbered as in FIG. 1. The housing 100 is divided longitudinally into compartments 101 by partitions 102 which are solid and impervious except for apertures allowing flow of liquid as described below from one compartment to the next. (It will be understood that "impervious" does not exclude small bleed lines and orifices such as those described above in connection with FIG. 1). Each compartment contains a stage of Zone III and the corresponding stage of Zone IV. Hot sea water entering Zone III through line 31 into stage n of Zone III enters a tray 104 having a perforated bottom 105 through which it falls in small droplets into a tray 106 thereberneath. This breaking up of the hot sea water into fine droplets provides a greatly increased surface and greatly accelerates the rate of evaporation. An increment of water vapor is thus produced in stage n and the remainder of the hot sea water passes through aperture 103 to stage $n-1$ where it is received by a tray 104 and falls in the form of droplets through the perforated bottom 105 into the underlying tray 106, and again a further increment of evaporation occurs. This process continues from stage to stage until stage 1 is reached.

Cold fresh water introduced at stage 1 of Zone IV enters a tray 110 having a perforated bottom 111 and falls through the perforated bottom in the form of droplets into a tray 112. Very efficient contact occurs between this cold fresh water and water vapor from the tray 106 in stage 1 of Zone III thereby condensing the water vapor which is caught in tray 112. This process continues until the fresh water (that introduced into stage 1 of Zone IV through line 46 plus the accumulating increments from the respective stages of Zone III) reaches stage n of Zone IV and falls into tray 112 of that stage from which it is withdrawn for recirculating. A heat input is indicated at 115, for example, by direct or indirect heat exchange with steam. The various trays — 104, 106, 110 and 112 — are indicated for convenience as being of the same size, but they may be of different sizes to accommodate the different volumes of liquid that they carry. Also these trays are shallow, e.g. about 2 to 12 inches in depth.

The system shown in FIGS. 2 and 3 is especially well adapted to the utilization of small differentials such as are available from the condenser heat of a steam-electric power plant. This condensate typically has a temperature of about 90° to 150°F; it is too low to be of use in prior systems of desalination; and it is not only waste heat but it is a source of thermal pollution of lakes, streams, oceans and/or the atmosphere. A theoretical explanation of the phenomenon of using a relatively low-temperature source of heat such as condenser heat from steamelectric power plants is set forth below.

The boiling rate of water is controlled by a law similar to that governing heat transfer. The two equations are as follows:

Rate of heat transfer $(Q) = UA(T_2 - T_1)$ wherein $Q$ is the rate of heat transfer; $U$ is a constant; $A$ is the area through which heat is transferred; $T_1$ is the temperature on the remote side of the body through which heat is transferred; and $T_2$ is the temperature on the near side.

Rate of boiling $(N_a) = kA(P_2 - P_1)$ wherein $N_a$ is the rate of boiling, i.e., the rate at which liquid is converted to vapor; $k$ is a constant; $A$ is the area of contact between liquid and vapor; and $P_2 - P_1$ represents the difference between the vapor pressure of boiling liquid ($P_2$) and the partial pressure of the water vapor (in the case of boiling water) in the vapor phase. When boiling at, for example, 220°F, a temperature difference of only 1°F between the heating fluid and the water to be boiled produces a relatively large $P_2 - P_1$ of about 0.32 psi which is sufficient to overcome a hydrostatic head of about 1 foot. That is, under these conditions (a temperature of 220°F and a temperature difference of 1°F between the boiling water and the vapor space) the top 12 inches or so of a body of water will boil and the rate of boiling and of evaporation will be large. The rate of boiling can be further increased by bubbling, for example, by as much as 100 to 1000 times, because bubbling increases the factor A. Bubbling also increases $k$ because of the turbulence effect; therefore, at high temperatures rapid evaporation can be effected with very small temperature differences.

However, if water is boiling at 100°F, $P_2 - P_1$ is drastically diminished (to about 0.028 psi); therefore, boiling is confined to the top 1 inch or so of the body of water.

Similar considerations apply to condensation of water vapor by a body of cooler water inasmuch as condensation and boiling are reversible processes.

Because of these factors, condenser heat from steam-electric power plants has not been practicable for desalination by conventional methods employing out-of-contact heat transfer between the heating fluid (condenser water) and the heated fluid (sea water). Conventional systems require at each stage a relatively large heat differential, which is made up of the heat differential (about 8–10°F) required between the condensing water vapor and the heated water which is being evaporated and a non-equilibrium differential of about 5–15°F required for boiling at a commercially acceptable rate. The temperature of condenser water is typically about 90–150°F and a practical heat sink temperature is 60°F. The difference between these temperatures is not sufficient to operate any but a very few stages. Hence normal condenser heat has not been practical for the purpose of desalination heretofore.

In the system of FIGS. 2 and 3, however, the use of condenser heat is practicable. In this system the circulating sea water in Zone III and the circulating fresh water in Zone IV are broken up into small droplets; salt water carryover is diminished greatly because of the large passageways between the respective stages of the two zones; the evaporating trays, being shallow, do not impose a high hydrostatic head, hence the entire volume of liquid in these trays undergoes boiling; etc. As a result, each pair of stages in Zones III and IV can operate at a high value of $N_a$ on a very small temperature difference between the two stages, e.g. about 1°F. This permits a large number of stages between the condenser temperature of 90–150°F and the heat sink temperature of 60°F. Moreover, this utilizes waste heat which would otherwise be a pollution problem. The apparatus of FIGS. 2 and 3 may be large but the construction is uncomplicated. There may be two or more sets of evaporating trays 104, 106 in each compartment 101 with one set above the other or others; likewise there may be two or more sets of condensing trays 110, 112 in each compartment with one set above the other or others.

Figure 4:
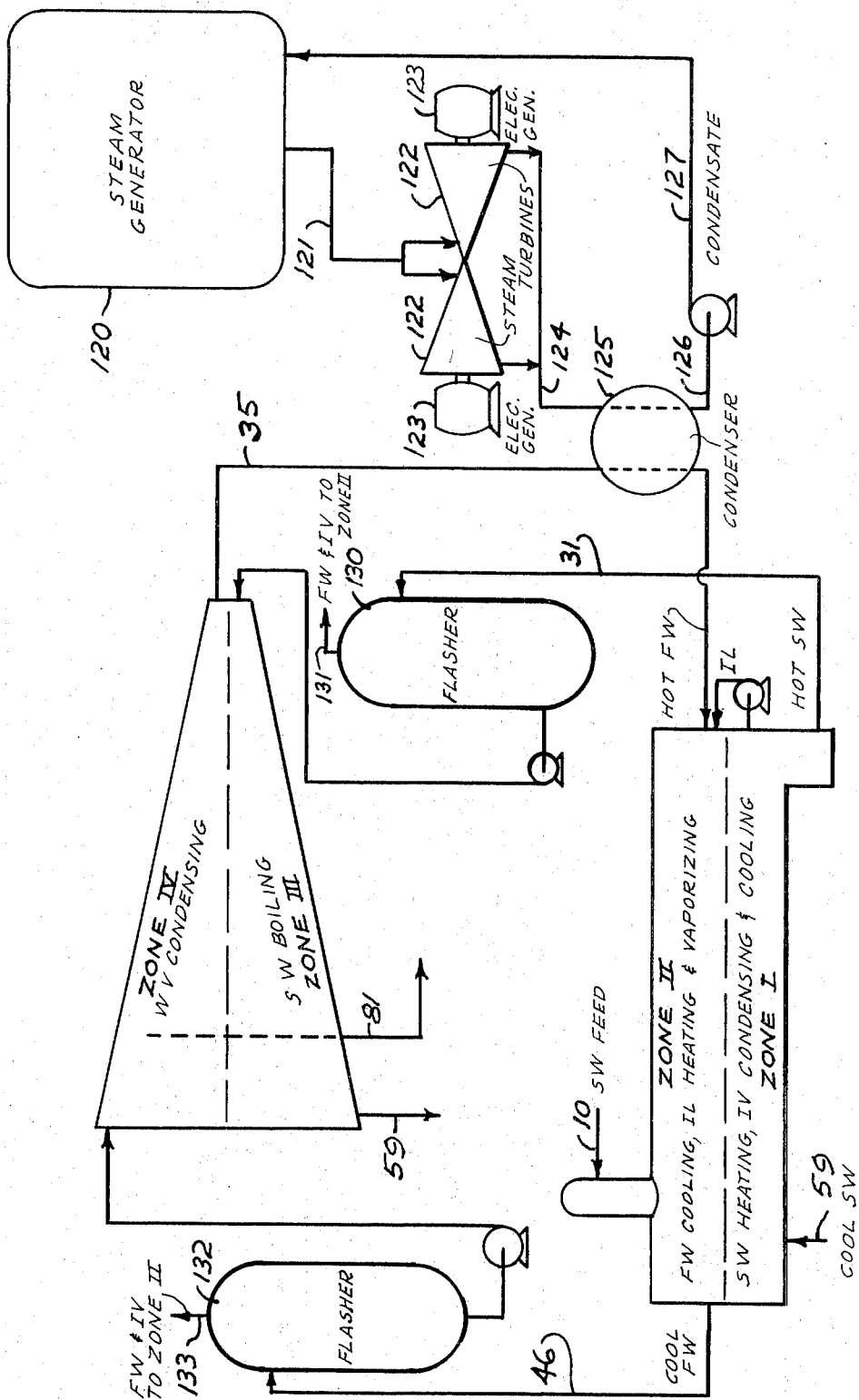
FIG. 4 is a view showing the apparatus of FIGS. 2 and 3 in combination with a steam-electric power plant.

Referring now to FIG. 4, an adaptation of the sea water flashing appartus (Zones III and IV) of FIGS. 2 and 3 to a steam-electric power plant is shown. The salt water heating and immiscible liquid vaporizing Zones I and II respectively, may involve concurrent flow of the respective fluids and may employ a narrow boiling immiscible liquid or a single species, in which case, the construction of Zones I and II may be as in FIG. 1. If, however, counter current flow and/or a wide boiling immiscible fluid, for example, a light gasoline, are employed, the construction of Zones I and II may be described in my U.S. Pat. No. 3,640,850 with reference to FIG. 5 thereof. In the following description it is assumed that Zones I and II are as in FIG. 1 of this present application.

Referring to FIG. 4, Zones I and II are as in FIG. 1, Zones III and IV are as in FIGS. 2 and 3 and the sea water inlet, heated salt water line to Zone III, brine return and reject, fresh water recycle and withdrawal, etc. lines are numbered as in FIG. 1. A steam generator is shown at 120 which may employ fossil fuel (coal, natural gas), nuclear fuel or a geothermal source. Steam at high pressure passes through line 121 which branches to steam turbines 122 which operate in tandem and drive electric generators 123. Exhaust steam passes from the turbines through line 124 to a condenser 125, thence is returned as condensate by boiler feed pump 126 through line 127 to the steam generator 120. The arrangement thus shown diagrammatically is that of a conventional steam-electric power plant. Fresh water returning from Zone IV to Zone II passes through the condenser 125 and takes up heat from the condenser by out-of-contact heat transfer of the condensing steam. This location of the condenser 125 is convenient, although it may be placed differently in the desalination system of FIG. 4. Since the water in line 35 is fresh waer, it is not as corrosive as the sea water line 31.

Heated sea water in line 31 is given a preliminary flash in flasher 130, the vented immiscible liquid entrained and dissolved in the sea water being separated as vapor at 131 and returned to Zone II. Similarly cold water circulating to Zone IV through line 46 is given a preliminary flash in flasher 132 and the flashed immiscible vapor is vented through line 133 and is returned to Zone II.

Figure 5:
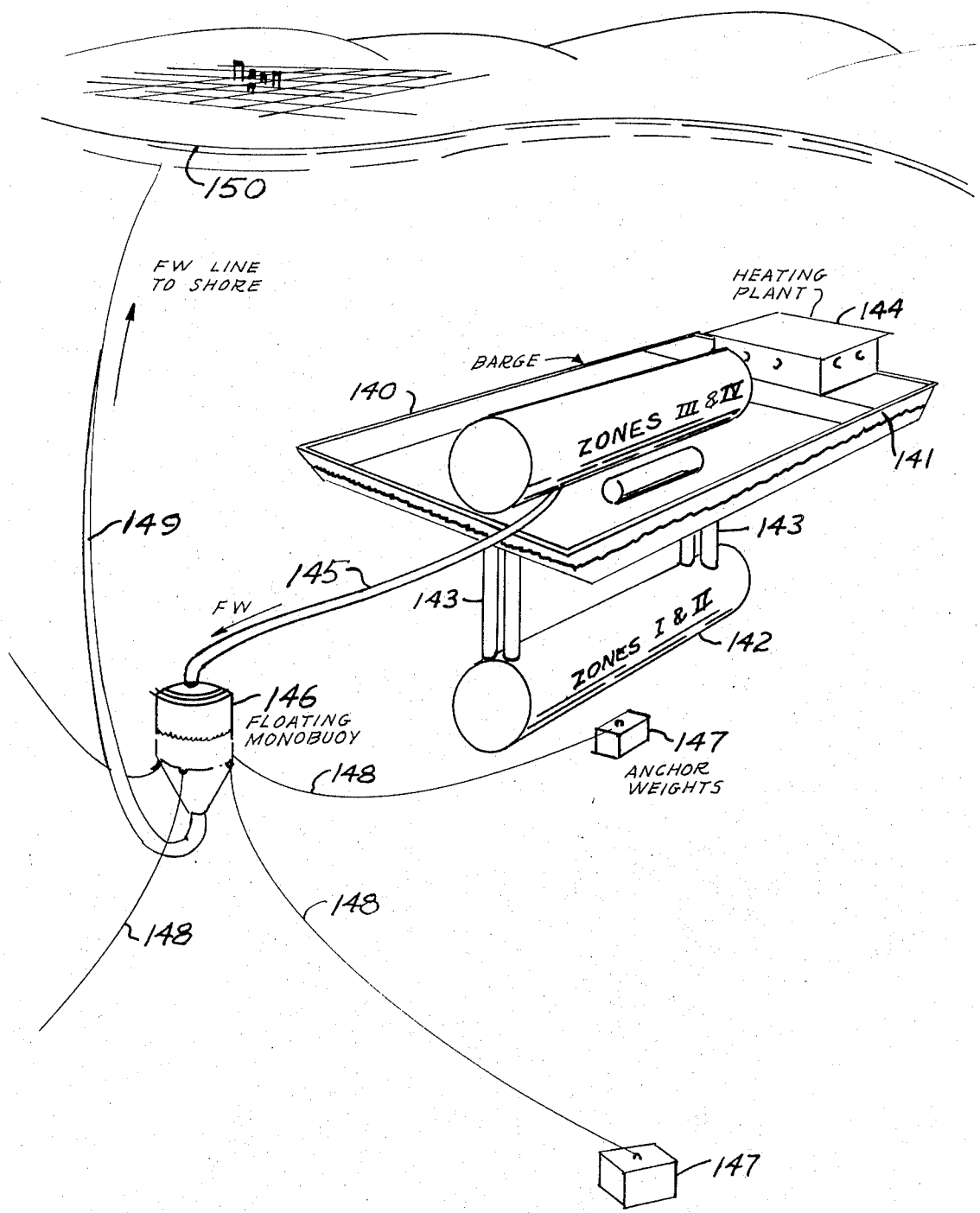
FIG. 5 is a view showing a barge-mounted embodiment of the invention adapted to be operated off-shore.

Referring now to FIG. 5, a barge mounted system is there shown which is generally designated as 140 and comprises a floating, partially submerged hull or platform 141; a submerged portion 142 and structural members 143, e.g. in the form of tubes, connecting the two elements 141 and 142. Zones I and II are located in submerged part 142 and Zones III and IV are located in hull or platform 141. These zones may be as in FIGS. 1 or as in FIGS. 2 and 3 of this application or as shown and described in my U.S. Pat. No. 3,640,850. Lines connecting the submerged Zones I and II and Zones III and IV may be located in tubes 143. Structure 144 indicates a housing for personnel and for a heat generator for external heat input to the system. Fresh water is withdrawn through line 145 connnected to a mono-buoy 146 anchored by anchor weights 147 and lines 148. This mono-buoy is of known type, being presently used to transfer pertroleum from off-shore tankers to a shore side dock. A line 149 conveys fresh water to the shore, shown at 150. It will be understood that auxiliary equipment such as circulating pumps, a sea water inlet, sea water pretreatment apparatus, pumps, heat exchangers, agitators, valves, etc. as described above and as necessary will be used.

The sea-going apparatus of FIG. 5 offers certain important advantages. It can be built in a shipyard; it can be towed from place to place according to seasonal needs and/or emergencies such as a drouth; it avoids the difficulties of construction on land, etc.

It will therefore be apparent that useful and very advantageous apparatus for and methods of producing fresh water from dilute aqueous solutions of non-volatile solutes are provided.

I claim:

1. Apparatus for the direct contact transfer of latent heat of condensation of the vapor of an immiscible liquid A to a dilute solution S comprising a liquid B, such solution containing a non-volatile solute, and for evaporation of liquid B from the solution S, said liquids A and B being immiscible and liquid A having a narrow boiling range lower than the boiling point of liquid B and having a density different than the density of solution S, said apparatus comprising:
   a. a first (solution S heating) zone (zone I) divided into a plurality of stages and including an input stage an output stage and a plurality of intermediate stages,
   b. means providing for flow of solution S between but preventing flow of vapor between successive stages of zone I except for minor flow of bleed gases,
   c. a second (liquid A vaporizing) zone (zone II) divided into a plurality of stages corresponding to and paired with the stages of zone I and including an input stage, an output stage and a plurality of intermediate stages, said zone I and zone II stages being arranged for countercurrent flow of liquids in the two zones,
   d. means providing for flow of liquid between but preventing flow of vapor between successive stages of zone II except for minor flow of bleed gases,
   e. vapor transfer means between each pair of corresponding stages of zone II and zone I whereby vapor of liquid A generated in the respective stage of zone II is caused to pass in finely divided form into a body of solution S in the respective stage of zone I and to form a liquid condensate (liquid A) therein thus heating solution S,
   f. a third (solution S flashing) zone (zone III),
   g. a fourth (liquid B vapor condensing) zone (zone IV),
   h. means for separating heated solution S from condensate (liquid A) derived from the output stage of zone I,
   i. means for transferring the resulting separated condensate of liquid A to the input stage of zone II for re-evaporation therein,
   j. means for transferring resulting separated heated solution S to and through zone III to be flashed therein to produce vapor of liquid B and means for recycling a portion of the unevaporated solution S from the output stage of zone III to the input stage of zone I and withdrawing the remainder of unevaporated solution S from the system,
   k. means for transferring vapor of solution S formed by flashing in zone III to liquid B flowing in zone IV and condensing such vapor therein, and
   l. means for circulating resulting condensate of vapor of solution S in admixture with liquid B through zone IV to the input stage of zone II in admixture with liquid A from elements (h) through zone II and back to zone IV to condense vapor of solution S in zone IV and to evaporate liquid A in zone II.

2. The apparatus of claim 1 wherein zone III (solution S flashing) and zone IV (vapor of liquid B condensing) are provided each with a plurality of stages including an input stage, an output stage, and a plurality of intermediate stages arranged in corresponding pairs that permit liquid flow but prevent vapor flow between successive stages, each such pair comprising a stage in zone III and a stage in zone IV, and vapor transfer means extending from the vapor space in each stage of zone III into the liquid space within the corresponding stage of zone IV and terminating in a device for breaking up the vapor of liquid B into bubbles within the body of liquid B in zone IV.

3. The apparatus of claim 1 wherein zone II is located above zone I with the stages of zone II in substantial vertical alignment with the respective stages of zone I and the vapor transfer means of each pair of corresponding stages comprises a tube extending from the vapor space in the stage of zone II into the liquid space in the stage of zone I and bubbler means within such liquid space adapted to break up incoming vapor into bubbles.

4. The apparatus of claim 3 wherein zones I and II slope downwardly from the input stage of zone I (and the output stage of zone II) whereby solution S and condensate of the vapor of liquid A will flow by gravity to the output stage of the zone I and the hydrostatic head in zone II diminishes from its input stage to its output stage.

5. Apparatus of claim 1 in combination with a marine installation comprising a submerged structure and a surface structure and means connecting the two structures, said zones I and II being located in the submerged structure and said third and fourth zones being located in the surface structure.

6. The apparatus of claim 5 wherein the apparatus is buoyant and the surface structure is floating.

7. In the production of fresh water (FW) from a dilute aqueous solution (SW) of a non-volatile solute by evaporation, wherein heat is imparted to the solution (SW) by direct contact with and condensation of the vapor (IV) of a water immiscible liquid (IL) that boils below the boiling point of water and the solution (SW), and wherein the resulting condensate (IL) of vapor (IV) of immiscible liquid (IL) is heated and re-evaporated by direct contact with hot fresh water (FW) produced in the process, the improvement which comprises:
  a. circulating hot aqueous solution (SW) heated as aforesaid by direct contact condensation of the vapor (IV) of immiscilbe liquid (IL) through a series of shallow bodies of solution (SW) in an evaporation zone and delivering the circulating solution (SW) to each such body in finely divided form,
  b. circulating fresh water (FW), cooled as aforesaid by diirect contact evaporation of immiscible liquid (IL) through a series of shallow bodies of fresh water (FW) in a condensing zone and delivering the circulating fresh water (FW) to each such body in finely divided form,
  c. causing evaporation of water (FW) from said bodies of solution and condensation of the resulting vapor (WV) in said bodies of fresh water (FW),
  d. recirculating the resulting fresh water (FW) to re-evaporate immisciible liquid (IL) by direct contact of the fresh water (FW) and immiscible liquid (IL)
  e. recirculating unevaporated solution (SW) to step (a), and
  f. conducting the steps of evaporation of solution (SW) and condensation of water vapor (WV) at successively diminishing pressures and with the flow of solution (SW) being counter to the flow of fresh water (IW).

8. A method of transferring heat from a liquid A to a solution S of a non-volatile solute in a liquid B, said liquids being immiscible and liquid A having a narrow boiling range lower than the boiling point of liquid B and solution S, such method comprising the following:
  a. providing a solution S heating and liquid A condensing zone (zone I) and a liquid A vaporizing and liquid B cooling zone (zone II), each having a plurality of stages including an input stage, an output stage, and a plurality of intermediate stages, said stages being arranged for flow of liquid through zone I counter-currently to the flow of liquid through zone II, the stages of the two zones being paired and the pairs being in vapor contact but not in liquid communication whereby vapor of liquid A produced in the stages of zone II may pass into the corresponding stages of zone I, the stages of each zone preventing vapor communication between one another except for minor flow of bleed gases,
  b. establishing and maintaining the circulation of solution S through the stages of zone I from the input stage to the output stage thereof and heating solution S by condensation in zone I of the vapor of liquid A from zone II then passing heated solution S from the output stage of zone I through a flashing zone III to flash evaporate solution S and then in cooled condition back to the input stage of zone I,
  c. condensing the vapor of solution S produced by flashing in zone III in a condensing zone IV via contact with a cooler body of liquid B in zone IV to provide a body of hot condensate (hot liquid B),
  d. establishing and maintaining circulation of such body of liquid B in zone IV deriving from the flashing step of zone III to the input stage of zone II in admixture with liquid A from the output stage of zone I and through zone II to its output stage, thence in cooled condition back to the condensing zone IV to condense further quantities of vapor of solution S,
  e. establishing and maintaining concurrent flow of liquid A and liquid B through zone II whereby sensible heat of liquid B is absorbed by liquid A and liquid A is caused to vaporize, and diminishing the pressure in zone II from the input stage to the output stage thereof to facilitate such vaporization in the various stages of zone II, and
  f. establishing and maintaining a flow of vapor of liquid A resulting from step (e) to the corresponding stages of zone I and causing and maintaining a flow of condensate (liquid A) resulting from step (e) back to the input stage of zone II.

9. The method of claim 8 wherein liquid B is fresh water and is present in zones I and III in the form of solvent in a dilute solutions of a non-volatile solute, and liquid A is lighter in density than fresh water and solution S.

10. A method of evaporating water from a dilute aqueous solution (SW) of a non-volatile solute such as sea water wherein at least a major heat input to the solution (SW) is accomplished by direct contact of the vapor (IV) of a lower boiling immiscible liquid (IL) with the solution (SW) and condensation of such vapor (IV) within the body of solution (SW) to transfer its latent heat of condensation to the solution (SW) and wherein an external heat input is provided to make up for heat losses and for the thermal energy required to separate water from solute, said method comprising:
  a. providing four zones (zones I, II, III, IV) which are the solution (SW) heating, immiscible liquid (IL) vaporizing, solution (SW) flashing and water vapor (WV) condensing zones, respectively, each such zone having an input stage, an output stage and a plurality of intermediate stages; the stages of each zone having liquid communication such that the liquid processed in such zone may flow into the input stage, thence to and through the intermediate stages, thence to the output stage of the respective zone; the stages of zone I being paired with those of zone II and the stages of zone III being paired with those of zone IV, and the paired stages being in vapor communication such that vapor (IV) but not liquid (IL) may pass from the stages of zone II to the corresponding stages of zone I and vapor (WV) but not liquid (SW) (IL) may pass from the stages of zone III to the corresponding stages of zone IV, the paired stages being provided with vapor transfer means to effect intimate contact of the vapor from the stages of zones II and III with the bodies of liquid in the corresponding stages of zones I and IV; the stages of zone I and zone II being arranged for countercurrent flow of liquids in zone I and zone II and the stages of zone III and zone IV being arranged for countercurrent flow of liquids in zone III and zone IV;

b. causing circulation of solution (SW) into the input stage of zone I and through the successive intermediate stages thereof to the output stage of zone I, thence to the input stage of zone III and through the successive intermediate stages thereof to the output stage of zone III, thence back to the input stage of zone I; meanwhile withdrawing a portion of the circulating solution (SW) to prevent unwanted build-up of solute and also introducing new quantities of solution (SW) to make up for fresh water (FW) removed from the system;

c. causing circulation of fresh water (FW) to the input stage of zone II and through the successive intermediate stages thereof to the output stage of zone II, thence to the input stage of zone IV and through the successive intermediate stages thereof to the output stage of zone IV, thence back to the input stage of zone II, meanwhile withdrawing a portion of the circulating fresh water (FW) as product;

d. causing flow of said immiscible liquid (IL) through the stages of zone II from the input stage and through the intermediate stages to the output stage of zone II in intimate contact with the fresh water (FW) circulating through zone II, thereby evaporating an increment of immiscible liquid (IL) in each stage of zone II and producing an increment of vapor (IV) of immiscible liquid (IL) in each such stage;

e. transferring each such increment of vapor (IV) of immiscible liquid (IL) through the vapor transfer means of the respective pair of zone I - zone II stages, thereby effecting intimate contact of such increment of vapor (IV) with and within the body of solution (SW) in the corresponding stage of zone I and causing such increment of vapor (IV) to condense and to transfer its latent heat of condensation to such body of solution (SW) and to heat the body of solution (SW) by an increment;

f. separating condensate of the vapor (IV) of immiscible liquid (IL) resulting from step (e) from the heated solution (SW);

g. causing the separated condensate (IL) of vapor (IV) of immiscible liquid (IL) resulting from step (f) to flow into the input stage of zone II;

h. vaporizing an increment of solution (SW) in each stage of zone III by progressively diminishing the pressure from the input stage to the output stage of zone III, thereby producing an increment of water vapor (WV) in each stage of zone III;

i. transferring each such increment of water vapor (WV) produced in step (h) through the vapor transfer means of the respective pair of zone III - zone IV stages to the respective zone IV stage and effecting intimate contact therein of such increment of vapor (WV) with and within the body of fresh water (FW) in the corresponding stage of zone IV and causing such increment of vapor ((WV) to condense and to transfer its latent heat of condensation to such body of fresh water (FW) and thereby heating the circulating fresh water (FW) by an increment.

11. The method of claim 10 wherein the immiscible liquid (IL) is lighter in density than water.

12. Multi-stage apparatus for evaporating a dilute aqueous solution (SW) of a non-volatile solute and condensing the resulting water vapor (WV), such apparatus being adapted to operate on a small temperature difference between the respective evaporating and condensing areas, said apparatus comprising:

a. a plurality of enclosed compartments sealed from one another except for transfer of liquids from compartment to compartment and for minor flow of bleed gases between compartments, b. an evaporating assembly and a condensing assembly in each compartment which are in vapor communication but not in liquid communication such that a stream of solution (SW) may flow through the evaporation assemblies in successive compartments separately from a stream of fresh water (FW) flowing through the condensation assemblies in successive compartments, and such that water vapor (WV) resulting from evaporation of solution (SW) in each evaporation assembly may condense in the condensation assembly of the same compartment, c. the compartments and assemblies being arranged for flow of solution (SW) in one direction from an input evaporating assembly through a plurality of successive down-stream evaporating assemblies to an output evaporating assembly and for flow of fresh water (FW) in the opposite direction from an input condensing assembly through a plurality of successive downstream condensing assemblies to an output condensing assembly, d. solution transfer and delivery means for transferring solution (SW) from each upstream evaporating assembly to the next downstream assembly, at least some of such solution transfer and delivery means acting to deliver solution to the respective downstream assemblies in the form of a multiplicity of streams of solution providing a large, continuously replenished evaporating surface, e. fresh water transfer and delivery means for transferring fresh water (FW) from each upstream condensing assembly to the next downstream condensing assembly, at least some of such fresh water transfer and delivery means acting to deliver fresh water (FW) to the respective downstream assemblies in the form of a multiplicity of streams of fresh water (FW) providing a large, continuously replenished condensing surface, and f. means for continuously supplying hot solution (SW) to the input evaporation assembly, withdrawing cooled, partially evaporated solution (SW) from the output evaporating assembly, supplying cold fresh water (FW) to the input condensing assembly and withdrawing heated fresh water (FW) including condensate (FW) from the output condensing assembly.

13. The apparatus of claim 12 wherein the compartments are of progressively increasing size from a smallest size to a largest size, the compartment of smallest size containing the input evaporating assembly and the output condensing assembly, the compartment of largest size containing the output evaporating assembly and the input condensing assembly and the compartments of intermediate size being arranged in progressively increasing size from the smallest compartment to the largest compartment and containing the corresponding evaporating and condensing assemblies.

14. The apparatus of claim 12 wherein the solution (SW) and fresh water (FW) transfer and delivery means that deliver liquid in the form of a plurality of streams each comprises a perforated member receiving liquid from the preceding upstream assembly and causing the liquid to fall through its perforations to form the aforesaid multiplicity of streams.

15. The apparatus of claim 12 wherein the hot solution (SW) supply and fresh water (FW) supply means of (f) comprise a direct contact heat transfer assembly including a solution (SW) heating zone (zone I) having a solution (SW) inlet connected to the aforesaid output evaporating assembly and a solution (SW) outlet connected to the aforesaid input evaporation assembly, an immiscible liquid (IL) evaporating zone (zone II) having a fresh water (FW) inlet connected to the aforesaid output condensing assembly and a freshwater (FW) outlet connected to the aforesaid input condensing assembly, immiscible vapor (IV) transfer means for transferring vapor of immiscible liquid (IL) from zone II to zone I, means for providing intimate contact of vapor (IV) so transferred with solution (SW) in zone I to condense the vapor (IV) and heat the solution (SW), means for separating resulting condensate (IL) from solution (SW) and means for transferring the separated condensate (IL) from zone I for re-evaporation in zone II by contact with hot fresh water (FW);

said apparatus also having means for replenishing the stream of circulating solution (SW), for removing solution (SW) to avoid unwanted build-up of solute, for withdrawing fresh water (FW) as product and for input of heat from an external source to make up for heat losses and to supply the thermal energy required to separate water from solute.

16. A multistage method of evaporating ater from a dilute aqueous solution (SW) of a non-volatile solute such as in sea water and condensing the resulting water vapor (WV), said method comprising:
  a. providing a series of evaporation stages for evaporating solution (SW) including an input stage, an outout stage and a plurality of intermediate stages, such upstream stage having delivery means for delivering its input of solution (SW) to the next downstream stage, at least some of such delivery means serving to deliver solution (SW) in the form of a multiplicity of streams which present a large and continuously replenished liquid evaporating surface;
  b. providing also a series of paired, corresponding condensation stages for condensing water vapor (WV) from the evaporation stages including an input stage, an output stage and a plurality of intermediate stages, each upstream stage having means for delivering its input of fresh water (FW) to the next downstream stage, at least some of such delivery means serving to deliver fresh water (FW) in the form of a multiplicity of streams which present a large and continuously replenished liquid condensing surface,
  c. such evaporation and condensation stages being arranged for flow of solution (SW) through the evaporation stages counter to the flow of fresh water (FW) through the condensation stages, the members of each pair of evaporation and condensation stages being in open vapor communication with one another,
  d. causing solution (SW) to flow through the evaporation stages from the input stage to the output stage and delivering solution (SW) to at least some of the stages in the form of a multiplicity of streams,
  e. causing fresh water (FW) to flow through the condensation stages from the input stage to the output stage and delivering fresh water (FW) to at least some of the stages in the form of a multiplicity of streams,
  f. supplying to the circulating solution (SW) from the condensing stages and recirculating the cooled fresh water (FW) to the input condensation stage.
  g. cooling the hot effluent fresh water (FW) from the condensing stages and recirculating the cooled fresh water (FW) to the input condensation stage
  h. withdrawing some of the circulating fresh water (FW) as product, withdrawing some of the circulating solution (SW) to prevent unwanted build up of solute and supplying make up solution (SW) to the circulating stream of solution (SW).

17. The method of claim 16 wherein the incoming heated solution derives its heat at least in part from exhaust steam.

18. The method of claim 16 wherein the circulating fresh water (FW) is cooled at least in part by direct contact evaporation of a lower boiling immiscible liquid (IL) and the resulting vapor (IV) of immiscible liquid (IL) is employed to heat the circulating solution (SW) by direct contact condensation with the solution (SW).

19. The method of claim 16 wherein at least part of the heat input supplied in step (f) is in the form of direct injection of steam into zone IV.

20. The method of claim 19 wherein such direct injection of steam is into the output stage of zone IV.

21. In combination with a high pressure steam power facility, including a boiler for generating high pressure steam, a prime mover operated by the high pressure steam, a steam condensor for condensing exhaust steam from the prime mover, means for supplying high pressure steam from the boiler to the prime mover and steam and condensate circulating means for passing steam from the prime mover to the condensor and for returning condensate from the condensor to the boiler:
  a desalination plant for recovery of fresh water (FW) from saline water (SW) by distillation, said desalination plant comprising a multi-stage evaporating apparatus comprising a plurality of the evaporation stages including an input stage, an output stage and a plurality of intermediate stages and a plurality of condensing stages paired with the evaporation stages and comprising an input stage, an output stage and a plurality of intermediate stages, each condensation stage being paired with and in vapor communication with but not in liquid communication with the corresponding evaporation stage, the evaporation and condensation stages being arranged for flow of saline water (SW) through the evaporation stages countercurrently to flow of fresh water (FW) through the condensation stages; at least some of the upstream evaporation stages and some of the upstream condensation stages having liquid delivery means for delivering liquid in finely divided form to the downstream stages;

said desalination plant also including a saline water (SW) circulating system for circulating saline water (SW) to the aforesaid input evaporation stage, through the successive downstream evaporation stages to the output evaporation stage and thence back to the input evaporation stage, such saline water (SW) circulating means also including means for withdrawing sufficient circulating saline water (SW) to prevent unwanted build-up of solute and means for supplying make up saline water (SW);

said desalinating plant also including a fresh water (FW) circulating system for circulating fresh water (FW) which is separate from the aforesaid steam and condensate circulating means, said fresh water (FW) circulating system comprising means for circulating fresh cool water (FW) to the aforesaid input condensation stage, then through the successive downstream condensation stages to the output condensation stage, then through cooling means separate from the aforesaid steam and condensate circulating means, and then back to the input condensation stage, such fresh water (FW) circulating system also comprising means for withdrawing a portion of the circulating fresh water (FW) as product;

and an interlock between the high pressure steam power facility and the desalination plant in the form of means for circulating either the circulating stream of saline water (SW) or the circulating stream of fresh water (FW) or both such streams through said steam condensor for out-of-contact transfer of heat from the exhaust steam of the steam power plant to the circulating stream or streams of fresh water (FW) and/or saline water (SW).

22. The system of claim 21 including means for cooling circulating fresh water employed in said condensation stages by commingling with and evaporation of a water immiscible liquid boiling lower than water and means for heating the circulating saline water employed in said evaporation stages by commingling the same with and condensation of the resulting vapor of immiscible liquid.

23. The combination of claim 21 wherein only the stream of fresh water is circulated through the steam condensor.

24. The combination of claim 23 including a direct contact assembly for reheating saline water (SW) passing between the output evaporation stage and the input evaporation stage and for cooling fresh water (FW) passing from the output condensation stage to the input condensation stage, such assembly comprising a zone I wherein circulating cold saline water (SW) is directly contacted with immiscible vapor (IV) or its hot condensate (IL) of a lower boiling immiscible liquid (IL) having a different density than the saline water (SW), whereby condensing such vapor (IV) and transferring its latent heat of condensation to the saline water (SW), said assembly also comprising a zone II wherein immiscible liquid (IL) is contacted directly with the circulating hot fresh water (FW) to evaporate the immiscible liquid (IL) and cool the fresh water (FW) together with means for separating condensate (IL) of immiscible vapor (IV) produced in zone I, returning such condensate (IL) to zone II and transferring vapor (IV) of immiscible liquid (IL) from zone II to zone I.

* * * * *

UNITED STATES PATENT OFFICE
CERTIFICATE OF CORRECTION

PATENT NO. : 3,856,631
DATED : December 24, 1974
INVENTOR(S) : CALVIN S. SMITH, JR.

It is certified that error appears in the above-identified patent and that said Letters Patent are hereby corrected as shown below:

Column 2, line 41, "3-3" should read "III-III";

Column 4, line 42, "decription" should read "description";

Column 6, line 29, "10" should read "70";

Column 15, line 38, "ater" should read "water";

Column 16, lines 13 to 15 should read as follows:

"f. supplying to the circulating solution (SW) the heat required for evaporation of water from the solution (SW)".

Signed and Sealed this

Twenty-first Day of September 1982

[SEAL]

Attest:

GERALD J. MOSSINGHOFF

Attesting Officer     Commissioner of Patents and Trademarks